(12) United States Patent
Lee et al.

(10) Patent No.: US 7,697,012 B2
(45) Date of Patent: *Apr. 13, 2010

(54) METHOD AND APPARATUS FOR RENDERING IMAGE SIGNAL

(75) Inventors: Seong-deok Lee, Kyungki-do (KR); Chang-yeong Kim, Kyungki-do (KR); Won-hee Choe, Gyeongsangbuk-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1280 days.

This patent is subject to a terminal disclaimer.

(21) Appl. No.: 10/636,689

(22) Filed: Aug. 8, 2003

(65) Prior Publication Data

US 2004/0234163 A1 Nov. 25, 2004

(30) Foreign Application Priority Data

Aug. 10, 2002 (KR) ............... 10-2002-0047358
Mar. 14, 2003 (KR) ............... 10-2003-0016016

(51) Int. Cl.
*G09G 5/02* (2006.01)
(52) U.S. Cl. ..................... 345/613; 349/108
(58) Field of Classification Search ......... 382/298; 345/613; 349/108
See application file for complete search history.

(56) References Cited

U.S. PATENT DOCUMENTS

| 4,800,375 | A |   | 1/1989 | Silverstein et al. |
| 4,991,122 | A |   | 2/1991 | Sanders |
| 5,122,783 | A | * | 6/1992 | Bassetti, Jr. ............ 345/88 |
| 5,225,823 | A | * | 7/1993 | Kanaly .................. 345/89 |
| 5,339,092 | A | * | 8/1994 | Johnson et al. ......... 345/611 |
| 5,341,153 | A | * | 8/1994 | Benzschawel et al. ... 345/694 |

(Continued)

FOREIGN PATENT DOCUMENTS

EP 0346621 5/1989

(Continued)

OTHER PUBLICATIONS

Foley et al, Computer Graphics: Principles and Practice, Second Edition in C, The Systems Programming Series, Addison Wesley Publishers (2$^{nd}$ edition, 1996).

(Continued)

*Primary Examiner*—Javid A Amini
(74) *Attorney, Agent, or Firm*—Staas & Halsey LLP

(57) ABSTRACT

Provided is a method for rendering image signals, which represent a predetermined number of colors, in an apparatus used for rendering an image signal that has a plurality of pixels composed of three different sub-pixels among four or more different sub-pixels. The method for rendering image signals comprises (a) selecting three-color signals out of the four or more color signals to be outputted according to a type of sub-pixel, which forms a predetermined pixel, (b) obtaining values of the selected three-color signals in peripheral pixels of the pixels, (c) calculating brightness values of each sub-pixel of the pixel by using the values of the selected three-color signals and corresponding color signal values of the peripheral pixels, and (d) driving a display, which controls brightness of an image that is represented in the display according to the calculated brightness values of sub-pixels.

41 Claims, 16 Drawing Sheets

U.S. PATENT DOCUMENTS

| | | | |
|---|---|---|---|
| 5,416,890 A * | 5/1995 | Beretta | 345/590 |
| 5,485,293 A * | 1/1996 | Robinder | 345/88 |
| 5,668,940 A * | 9/1997 | Steiner et al. | 345/592 |
| 5,781,257 A * | 7/1998 | Gal et al. | 349/57 |
| 5,929,843 A * | 7/1999 | Tanioka | 345/600 |
| 5,936,694 A * | 8/1999 | Suzuki et al. | 349/151 |
| 5,982,470 A * | 11/1999 | Nakahara et al. | 349/153 |
| 6,188,385 B1 * | 2/2001 | Hill et al. | 345/614 |
| 6,348,929 B1 | 2/2002 | Acharya et al. | |
| 6,384,839 B1 * | 5/2002 | Paul | 345/613 |
| 6,388,644 B1 * | 5/2002 | De Zwart et al. | 345/60 |
| 6,407,793 B1 * | 6/2002 | Liang et al. | 349/139 |
| 6,681,053 B1 * | 1/2004 | Zhu | 382/258 |
| 7,113,231 B2 * | 9/2006 | Conner et al. | 349/5 |
| 7,184,066 B2 * | 2/2007 | Elliot et al. | 345/694 |
| 7,268,757 B2 * | 9/2007 | Ben-David et al. | 345/88 |
| 7,268,792 B2 * | 9/2007 | Lee et al. | 345/694 |
| 2002/0008812 A1 * | 1/2002 | Conner et al. | 349/106 |
| 2002/0191009 A1 * | 12/2002 | Liang et al. | 345/694 |
| 2003/0011613 A1 * | 1/2003 | Booth, Jr. | 345/589 |
| 2003/0016318 A1 * | 1/2003 | Liang et al. | 349/106 |
| 2003/0095134 A1 * | 5/2003 | Tuomi et al. | 345/611 |

FOREIGN PATENT DOCUMENTS

| | | |
|---|---|---|
| EP | 0367848 A1 * | 5/1990 |
| EP | 0 778 696 | 6/1997 |
| EP | 0 778 696 A2 | 6/1997 |
| EP | 0 778 696 A3 | 7/1997 |
| JP | 09251160 * | 9/1997 |
| JP | 2002-191055 | 7/2002 |
| WO | 01/37251 A1 | 5/2001 |

OTHER PUBLICATIONS

European Search Report dated Jun. 20, 2005.
Korean Office Action dated Nov. 17, 2004 (with English translation), which was filed in an Information Disclosure Statement on Feb. 17, 2005 in U.S. Appl. No. 10/429,713.
European Search Report dated Jan. 10, 2006 which was filed in an Information Disclosure Statement on Feb. 21, 2006 in U.S. Appl. No. 10/429,713.
European Office Action dated Sep. 16, 2009, issued in corresponding European Patent Application No. 03254847.1.

* cited by examiner

FIG. 1

|  | col-1 | | | col-2 | | | col-3 | | | col-4 | | |
|---|---|---|---|---|---|---|---|---|---|---|---|---|
| Row-1 | R | G | B | R | G | B | R | G | B | R | G | B |
| Row-2 | R | G | B | R | G | B | R | G | B | R | G | B |
| Row-3 | R | G | B | R | G | B | R | G | B | R | G | B |
| Row-4 | R | G | B | R | G | B | R | G | B | R | G | B |

FIG. 2A

|  | col-1 | | col-2 | | col-3 | | col-4 | |
|---|---|---|---|---|---|---|---|---|
| Row-1 | R | G | R | G | R | G | R | G |
|  | B | W | B | W | B | W | B | W |
| Row-2 | R | G | R | G | R | G | R | G |
|  | B | W | B | W | B | W | B | W |
| Row-3 | R | G | R | G | R | G | R | G |
|  | B | W | B | W | B | W | B | W |
| Row-4 | R | G | R | G | R | G | R | G |
|  | B | W | B | W | B | W | B | W |

FIG. 2B

|  | col-1 | col-2 | col-3 | col-4 |
|---|---|---|---|---|
| Row-1 | R G B W | R G B W | R G B W | R G B W |
| Row-2 | R G B W | R G B W | R G B W | R G B W |
| Row-3 | R G B W | R G B W | R G B W | R G B W |
| Row-4 | R G B W | R G B W | R G B W | R G B W |

FIG. 3A

|  | col-1 | col-2 | col-3 | col-4 |
|---|---|---|---|---|
| Row-1 | R G B | R G W | R G B | R G W |
| Row-2 | R G W | R G B | R G W | R G B |
| Row-3 | R G B | R G W | R G B | R G W |
| Row-4 | R G W | R G B | R G W | R G B |

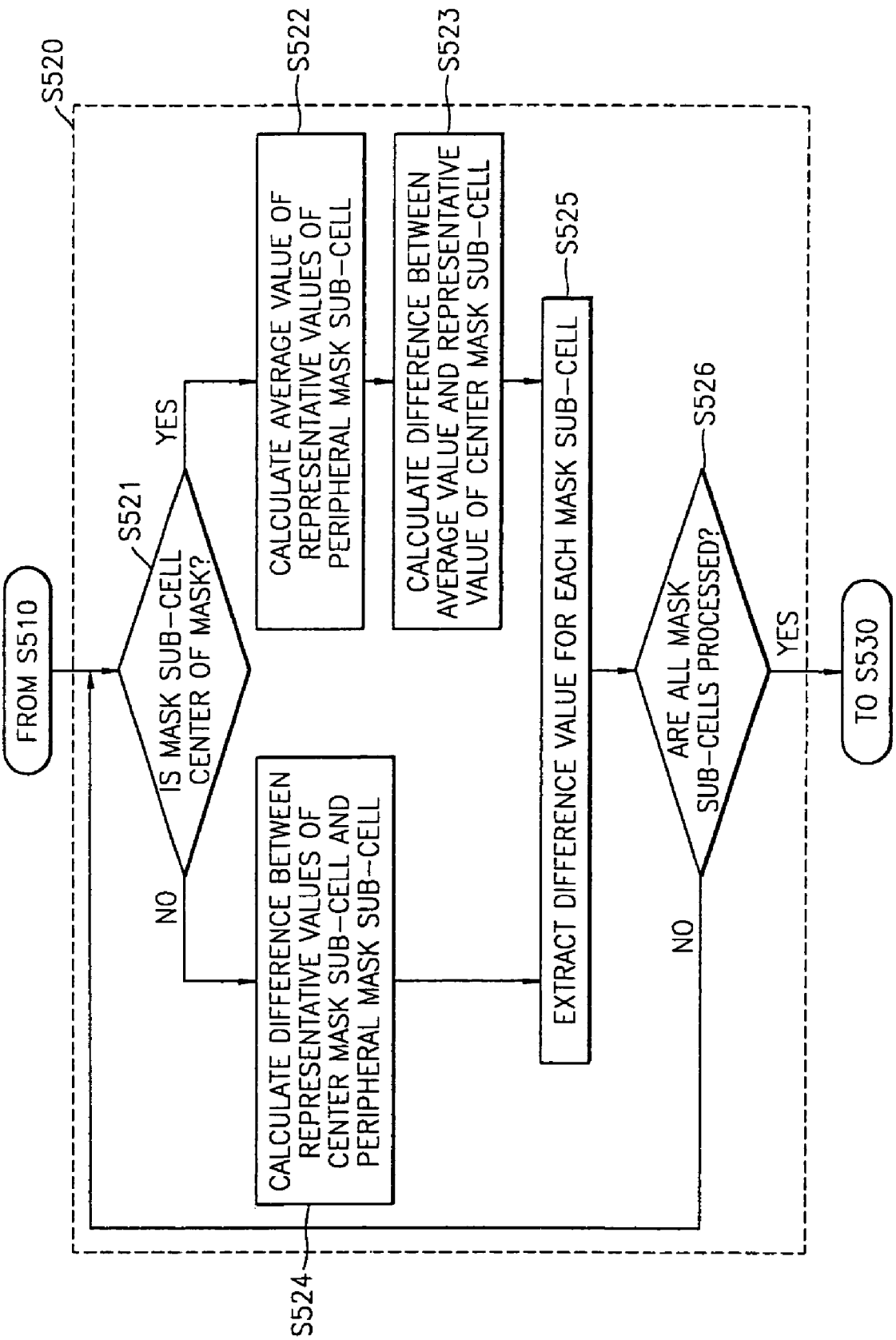

FIG. 6A

| m11 | m12 | m13 |
|-----|-----|-----|
| m21 | m22 | m23 |
| m31 | m32 | m33 |

FIG. 6B

| m11 | m12 | m13 | m14 | m15 |
|-----|-----|-----|-----|-----|
| m21 | m22 | m23 | m24 | m25 |
| m31 | m32 | m33 | m34 | m35 |
| m41 | m42 | m43 | m44 | m45 |
| m51 | m52 | m53 | m54 | m55 |

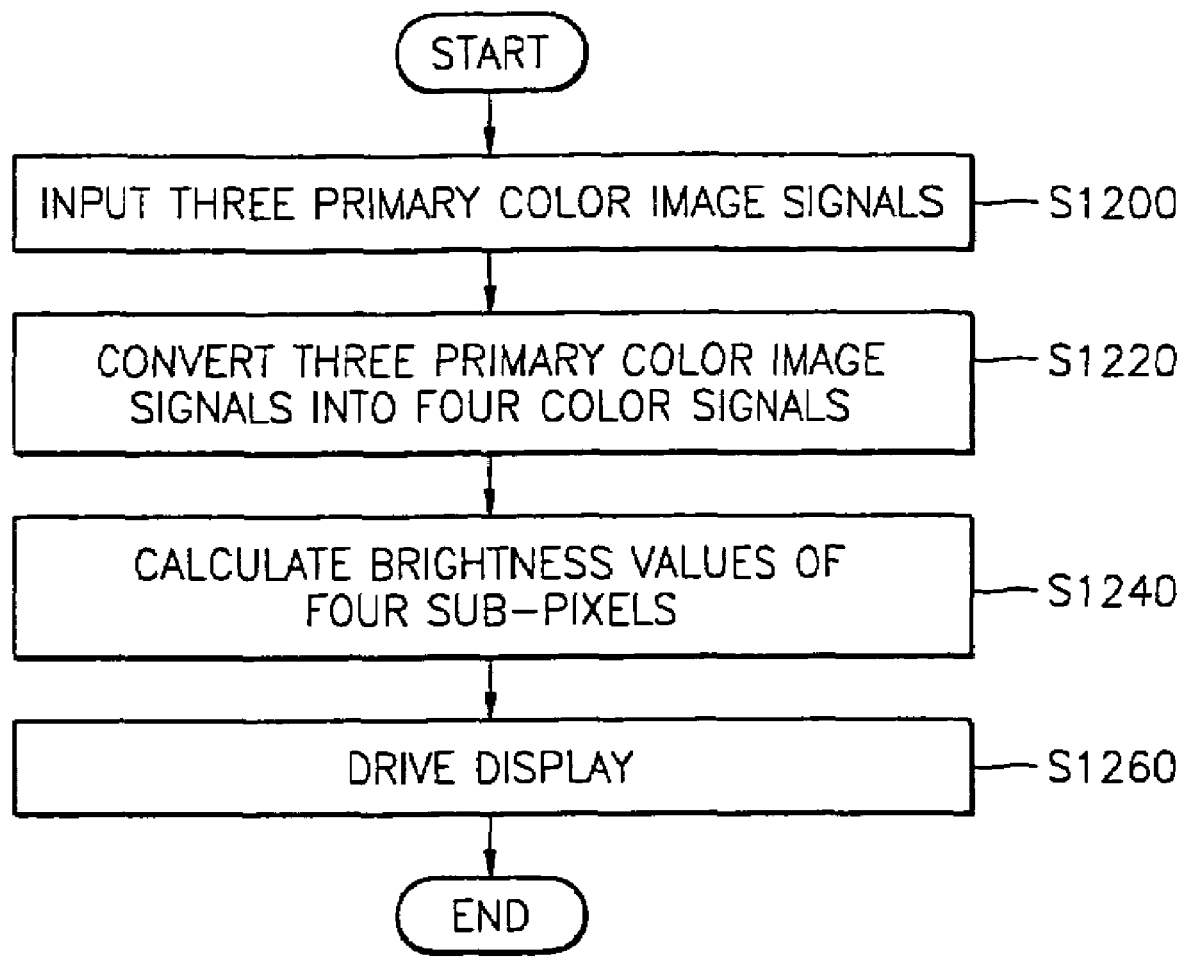

METHOD AND APPARATUS FOR RENDERING IMAGE SIGNAL

BACKGROUND OF THE INVENTION

This application claims the priority of Korean Patent Application Nos. 2002-47358, filed on Aug. 10, 2002 and 2003-16016, filed on Mar. 14, 2003, in the Korean Intellectual Property Office, the disclosure of which is incorporated herein in its entirety by reference.

1. Field of the Invention

The present invention relates to a method and apparatus for rendering an image signal, and more particularly, to a method for rendering an inputted image while minimizing degradation of image quality when the resolution of an inputted image signal is higher than the resolution of a display, and an apparatus for rendering an image signal using the method.

2. Description of the Related Art

When the number of actual pixels of a display is smaller than the number of pixels of an inputted image signal, or when the spatial resolution of the inputted signal is higher than that of the display, the image signal has to be down-sampled so that the entire area of the inputted signal can be presented on the display. However, due to down-sampling of the image signal, a jagged pattern occurs in the portions (for example, text, line, and edge, etc.) of an image with a high spatial frequency (hereinafter, referred to as aliasing), resulting in degraded quality of the image presented on the display.

As a conventional method for solving the above problem, an anti-aliasing method performed on a per-pixel basis has been introduced in "Computer Graphics: Principles and Practice" by Foley et al., Addison Wesley Publishers ($2^{nd}$ edition, 1996). In the method, an image signal is low-pass filtered, smoothened, and is then sampled to reduce the difference in brightness values between neighboring pixels, and to prevent rough image rendering phenomena, such as a jagged pattern. In the method, due to the reduction of the difference in brightness values between pixels, caused by low-pass filtering, blurring that the contrast effect of an image is reduced and the resolution of the image is greatly lowered, occurs.

A method for controlling a boundary between an object and a character on a per-sub-pixel (RGB component) basis is disclosed in U.S. Pat. No. 6,384,839 by Agfa Monotype Corporation. When processing for each sub-pixel, a sudden color transition at a boundary between objects can cause a color fringe error. In the method, the color fringe error is reduced by boundary processing for each sub-pixel, improving the resolution of an image and reducing the difference in brightness between adjacent pixels. In the method, in order to obtain a weight for reducing the brightness difference between adjacent pixels at a boundary between objects, an image is discriminated from a foreground and a background, the foreground and the background are binarized, and the image binarized to a 5-pixel wide window is low-pass filtered, thereby obtaining a weight for the an entire area of the image.

However, the method uses only a horizontal low-pass filter for an RGB-striped structure in a horizontal direction, and performs one-to-one conversion for each pixel, thus the same channel (sub-pixel having the same primary color) must be arranged in a vertical direction. Accordingly, the method is not suitable for adoption in a four-channel display and does not disclose processing, i.e., scaling required in a case where the image resolution is different from the display resolution.

SUMMARY OF THE INVENTION

The present invention provides a method and apparatus for rendering an image signal in which the apparent resolution of a display is increased by using different arrangement of sub-pixels when the spatial resolution of a display is lower than that of an inputted image signal, and more particularly, a method and apparatus for rendering an image signal in which the apparent spatial resolution of a four-primary color display, with restricted spatial resolution, is increased by performing color matching for each sub-pixel position using a different arrangement of sub-pixels.

According to an aspect of the present invention, there is provided a method for rendering image signals in an apparatus for rendering an image signal comprising pixels which are composed of three different sub-pixels among four or more different sub-pixels representing four or more color signals respectively, the method comprising (a) selecting three-color signals out of the four or more color signals to be outputted according to a type of sub-pixel, which forms a predetermined pixel; (b) obtaining values of the selected three-color signals in peripheral pixels of the pixels; (c) calculating brightness values of each sub-pixel of the pixel by using the values of the selected three-color signals and corresponding color signal values of the peripheral pixels; and (d) driving a display, which controls brightness of an image that is represented in the display according to the calculated brightness values of sub-pixels.

According to another aspect of the present invention, there is provided a method for rendering image signals in an apparatus for rendering an image signal comprising pixels which are composed of three different sub-pixels among four or more different sub-pixels representing four or more signals respectively, the method comprising: (a) selecting one-color signal out of the four or more color signals excluding predetermined two-color signals according to a type of sub-pixel, which forms a predetermined pixel; (b) obtaining a value of the selected one-color signal and representing the level values in peripheral pixels of the pixels; (c) calculating brightness values of each sub-pixel of the pixel by using the value of the selected one-color signal and corresponding color signal values of the peripheral pixels; and (d) driving a display, which controls brightness of an image that is represented in the display according to the calculated brightness values of three sub-pixels.

Preferably, step (c) comprises (c1) generating a representative value, which is the value of a predetermined color signal and to represent color signals of the sub-pixels contained in the pixels among inputted color signals in each mask sub-cell, with respect to each mask sub-cell; (c2) generating deviation information on a representative value between a center mask sub-cell and an adjacent mask sub-cell; and (c3) generating output color signal values, which are represented by sub-pixels contained in the center mask sub-cell to represent a predetermined color signal among the inputted color signals in an entire mask, according to the representative value and the deviation information. The mask includes a predetermined number of sub-cells having a size smaller than that of a pixel, and the sub-pixels that represent the predetermined color signal are contained in the center mask sub-cell.

According to another aspect of the present invention, there is provided an apparatus for rendering an image signal comprising pixels which are composed of three different sub-pixels among four or more different sub-pixels representing four or more colors respectively, the apparatus comprising: a signal selection unit that selects three-color signals with respect to each pixel out of the four or more color signals according to a type of sub-pixel, which forms a predetermined pixel; a color signal extracting unit that obtains values of the selected three-color signals to be represented in peripheral pixels of the pixels; a sub-pixel rendering unit that calculates brightness values to be represented in sub-pixels contained in the pixel by using the level values of the selected three-color signals and color signal values of the peripheral pixels; and a display driver that controls brightness of an image that is represented in the display according to the calculated brightness values of sub-pixels.

According to another aspect of the present invention, there is provided an apparatus for rendering an image signal comprising pixels which are composed of three different sub-pixels among four or more different sub-pixels representing four or more colors respectively, the apparatus comprising: a signal selection unit that selects an one-color signal out of the four or more color signals excluding predetermined two-color signals according to a type of sub-pixel, which forms a predetermined pixel; a color signal extracting unit that obtains a value of the selected one-color signal to be represented in peripheral pixels of the pixels; a sub-pixel rendering unit that calculates brightness values to be represented in sub-pixels contained in the pixels by using the value of the selected one-color signal and values of color signals of the peripheral pixels; and a display driver that controls brightness of an image that is represented in the display according to the calculated brightness values of three sub-pixels.

Preferably, the sub-pixel rendering unit comprises: a representative value calculation part that generates a representative value, which is a color signal value, to be outputted to represent color signals of the sub-pixels contained in the pixels among inputted color signals in each mask sub-cell, with respect to each mask sub-cell; a difference value calculation part that generates deviation information on a representative value between a center mask sub-cell and an adjacent mask sub-cell; and a sub-pixel value generation part that generates values of output color signals to be represented by sub-pixel contained in the center mask sub-cell to represent a predetermined color signal among the inputted color signals in an entire mask according to the representative value and the deviation information. The mask includes a predetermined number of sub-cells having a size smaller than that of a pixel, and the sub-pixels that represent the predetermined color signal are contained in the center mask sub-cell.

According to antoher aspect of the present invention, there is provided a method for rendering image signals which represent a predetermined number of colors in an apparatus with a plurality of pixels composed of a plurality of sub-pixels, the method comprising: (a) setting a mask having a predetermined number of sub-cells smaller than the pixel so that a center mask sub-cell includes sub-pixels that represent a predetermined color signal; (b) generating a representative value, which is a color signal value, to be outputted to represent the predetermined color signals among inputted color signals with respect to each mask sub-cell; (c) generating deviation information on a representative value between a center mask sub-cell and an adjacent mask sub-cell; and (d) generating output color signal values to be represented by sub-pixel contained in the center mask sub-cell and to represent a predetermined color signal among the inputted color signals in an entire mask according to the representative value and the deviation information.

According to another aspect of the present invention, there is provided a method for rendering image signals in an apparatus with a plurality of pixels composed of a plurality of sub-pixels, the method comprising: (a) selecting a second predetermined number of color signals out of a first predetermined number of color signals to be represented in the apparatus according to the type of a sub-pixel of the apparatus; (b) setting a mask having a predetermined number of sub-cells smaller than the pixel so that a center mask sub-cell includes sub-pixels that represent predetermined color signals among the second predetermined number of color signals; (c) generating a representative value, which is a color signal value, to be outputted to represent the predetermined color signal in the sub-pixel corresponding to each mask sub-cell, with respect to each mask sub-cell; (d) generating deviation information on a representative value between a center mask sub-cell and an adjacent mask sub-cell; (e) generating output color signal values which are represented by sub-pixel contained in the center mask sub-cell to represent the predetermined color signal among the second predetermined number of color signals in an entire mask area according to the representative value and the deviation information; and (f) performing (b) through (e) with respect to all of the second predetermined number of color signals.

According to another aspect of the present invention, there is provided an apparatus with a plurality of pixels composed of a plurality of sub-pixels, the apparatus comprising: a representative value generation unit that generates a representative value, which is a color signal value to be outputted to represent predetermined color signals in the sub-cells of the mask having a predetermined number of sub-cells having a size smaller than that of the pixels, with respect to each mask sub-cell; a deviation information generation unit that generates deviation information on a representative value between a center mask sub-cell and an adjacent mask sub-cell; a sub-pixel value generation unit that generates output color signal values, which are represented by sub-pixels contained in the center mask sub-cell to represent the predetermined color signal among the inputted color signals in an entire mask according to the representative value and the deviation information; and a display driver to control brightness of an image that is represented in the display according to the output color signal values generated by the sub-pixel value generation unit.

BRIEF DESCRIPTION OF THE DRAWINGS

The above and other aspects and advantages of the present invention will become more apparent by describing in detail preferred embodiments thereof with reference to the attached drawings in which:

FIG. 1 shows an example of the filter arrangement of an RGB-striped structure in a display;

FIGS. 2A and 2B show examples of the color filter structure of an LCD display, in which another primary color sub-pixel (white) is added to sub-pixels of RGB colors;

FIGS. 3A and 3B show other examples of the color filter structure of the LCD display, in which another primary color sub-pixel (white) is added to sub-pixels of RGB colors;

FIGS. 5D through 5G are detailed flowcharts illustrating the steps shown in FIG. 5C;

FIGS. 6A and 6B show the structure of a mask according to an embodiment of the present invention;

FIG. 12 is a flowchart illustrating a method for rendering an image signal performed in the apparatus shown in FIG. 11A.

DETAILED DESCRIPTION OF THE INVENTION

Hereinafter, preferred embodiments of the present invention will be described in detail, examples of which are illustrated in the accompanying drawings.

Hereinafter, a method and apparatus for rendering an image signal of four colors in a display, which contains pixels composed of three different colored sub-pixels, will be described. However, it is well-known to a person skilled in the art that a method for rendering an image signal of four or more colors according to the present invention can be adopted to a display that contains pixels composed of three or more different colored sub-pixels.

FIG. 1 shows an example of a filter arrangement of an RGB-striped structure in a display.

In methods for rendering a four-channel image signal in which a primary color is added to three RGB channels, when the added primary color is white, an output light of the primary color can be increased, and when the added primary color is a primary color excluding RGB colors, a renderable color area can be enlarged.

In addition, methods for converting a three-color (for example, RGB) signal into a four-color signal by adding one primary color and preventing a color change, which may occur when a certain primary color is added to sub-pixels of three primary colors, have been intensively studied. According to these methods, an RGBW four channel signal is generated by extracting a W signal from sub-pixels of RGB colors and updating a corresponding RGB signal using the extracted W signal.

FIGS. 2A and 2B show examples of a color filter structure of an LCD display in which another primary color sub-pixel (white) is added to sub-pixels of RGB colors. Here, W means either white or any primary color excluding RGB colors.

In the case of the color filter shown in FIG. 2A, a W filter cell exists as one pixel. In this case, one pixel is indicated by a dotted line and has a 2×2 grid shape composed of four sub-pixels. In the case of the color filter shown in FIG. 2B, the W filter cell exists in one pixel indicated by a dotted line, and in this case, one pixel is composed of four striped sub-pixels.

Figure 3B:
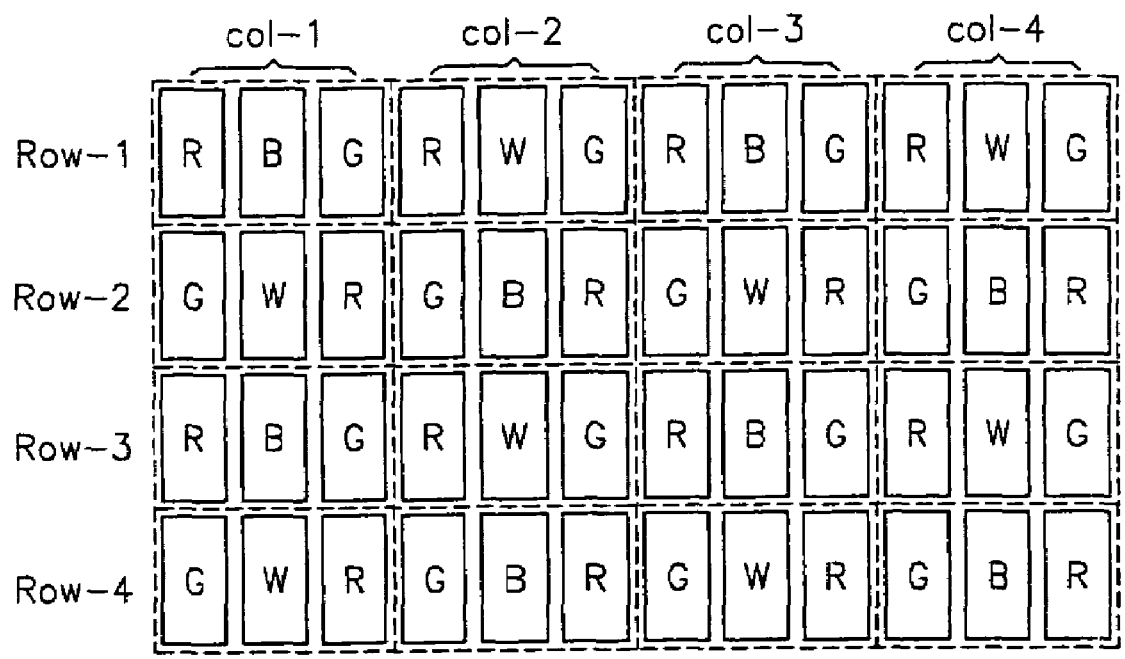

In the case of the color filter shown in FIGS. 3A and 3B, a W and B filter cells alternately exist in two pixels and each pixel is composed of three sub-pixels. In the filter shown in FIG. 3A, pixels in each row and each column are alternately arranged in the order of RGB-RGW. In the filter shown in FIG. 3B, odd rows contain pixels arranged in the order of RBG-RWG, and even rows contain pixels arranged in the order of GWR-GBR. In addition, odd columns contain pixels arranged in the order of RBG-GWR, and even columns contain pixels arranged in the order of RWG-GBR.

As shown in FIGS. 2A through 3B, unlike the structure of the three RGB channel filter, the structure of the color filter in the four RGBW channel display may be complicated and various. In this case, color matching for each sub-pixel of RGBW colors has to be performed according to the resolution of an inputted image signal, which may be different from that of the display.

Figure 4A:
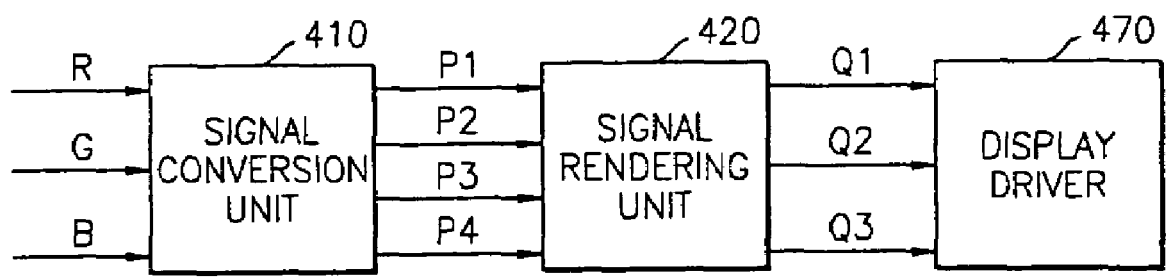
FIG. 4A is a block diagram illustrating the structure of an apparatus for rendering an image signal according to an embodiment of the present invention.
Figure 5A:
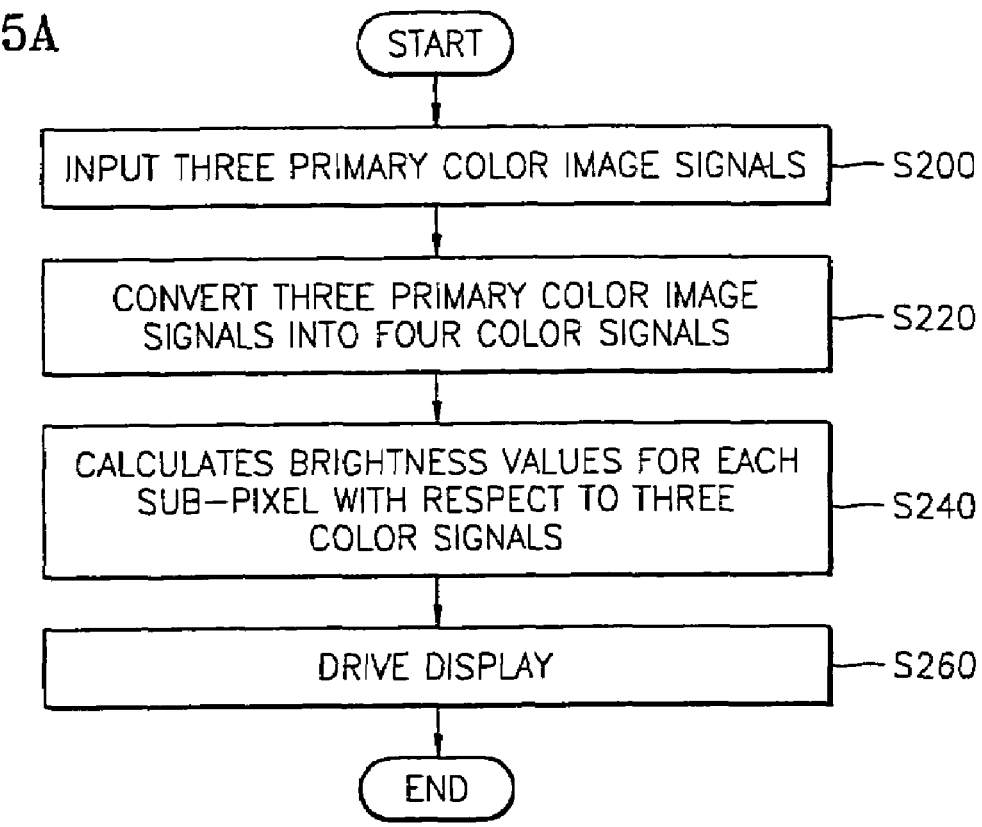
FIG. 5A is a flowchart illustrating a method for rendering an image signal performed in the apparatus shown in FIG. 4A, according to an embodiment of the present invention.

FIG. 4A is a block diagram illustrating the structure of an apparatus for rendering an image signal according to an embodiment of the present invention, and FIG. 5A is a flowchart illustrating a method for rendering an image signal performed in the apparatus shown in FIG. 4A, according to an embodiment of the present invention.

The apparatus for rendering an image signal includes a signal conversion unit 410, a signal rendering unit 420, and a display driver 470.

Three primary color image signals R, G, and B are inputted into the signal conversion unit 410 (S200). The signal conversion unit 410 receives the three primary color image signals R, G, and B, converts the three primary color image signals R, G, and B into four color signals P1, P2, P3, and P4, and outputs the converted four color signals P1, P2, P3, and P4 to the signal rendering unit 420 (S220).

The signal rendering unit 420 receives the four color signals P1, P2, P3, and P4, calculates brightness values for each sub-pixel with respect to the three color signals Q1, Q2, and Q3 out of 4-color signals and outputs a calculation result to the display driver 470 (S240). The display driver 470 controls output brightness according to the brightness values of the three color signals Q1, Q2, and Q3 (S260).

If image signals with spatial resolution higher than that of the display and according to an embodiment of the preset invention are inputted into an apparatus tat renders four color (RGBW) image signals, the inputted image signals are converted into four color signals by the signal conversion unit 410, and the corresponding four color signals are inputted into the signal rendering unit 420.

Figure 4B:
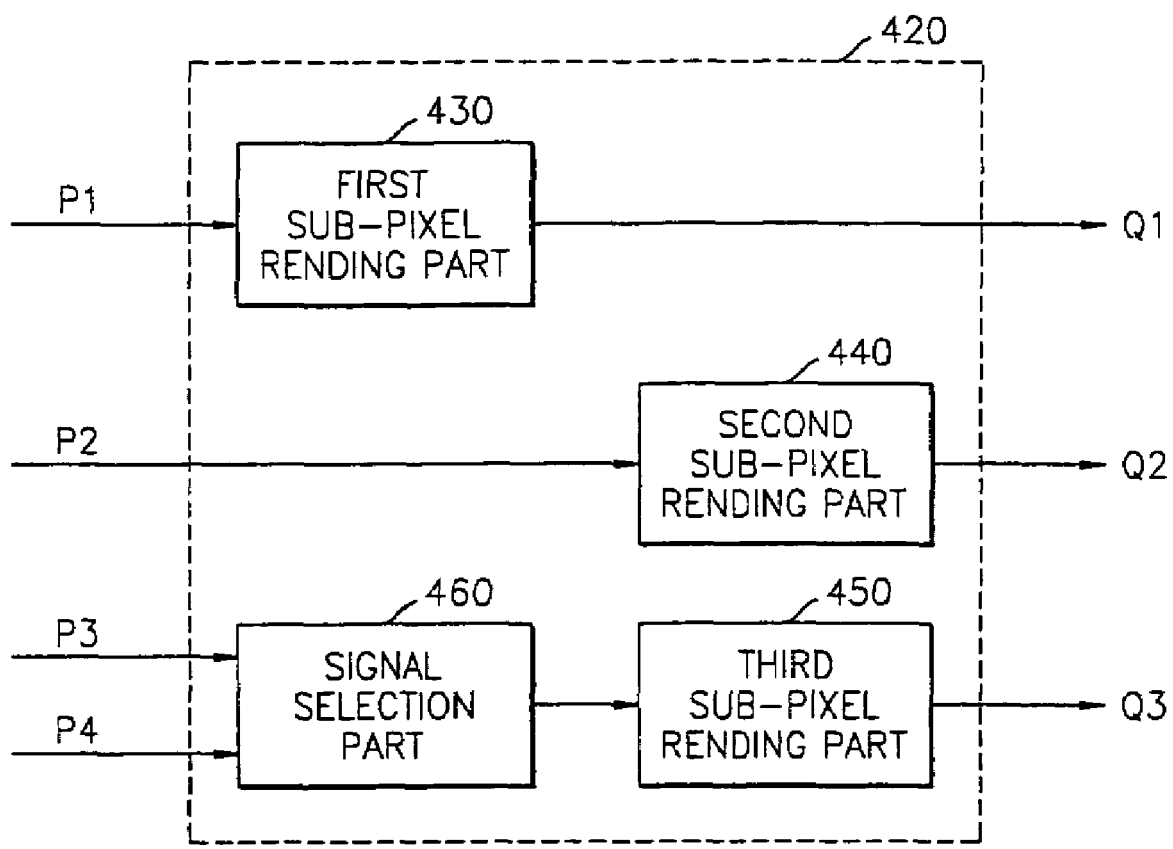
FIG. 4B is a block diagram illustrating the structure of a signal rendering unit 420 shown in FIG. 4A.
Figure 5B:
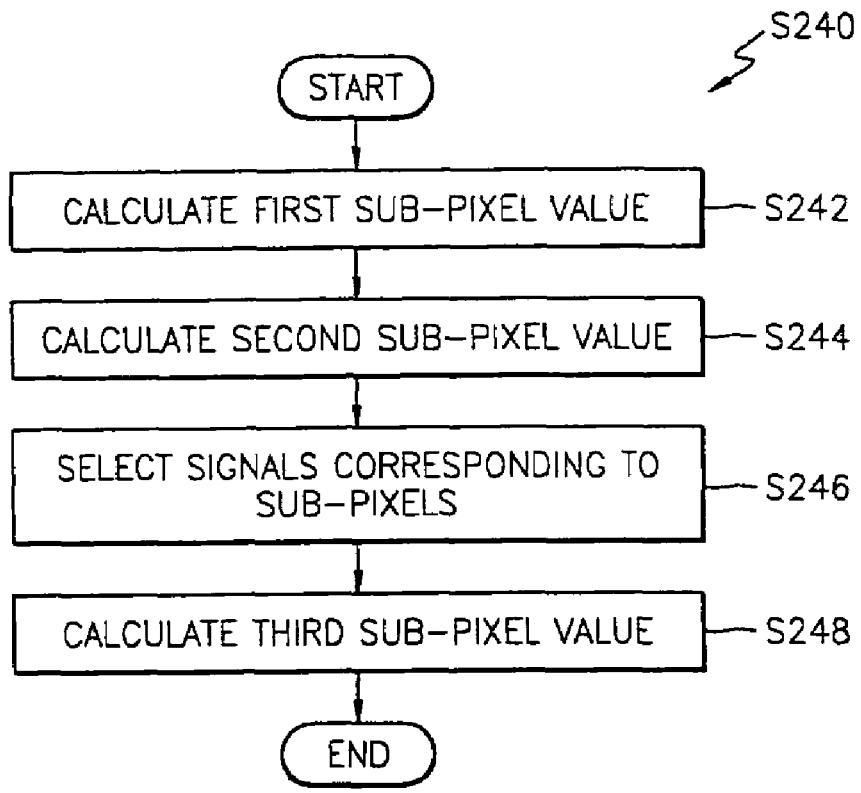
FIG. 5B is a detailed flowchart illustrating step S240 shown in FIG. 5A.

Hereinafter, the structure of the signal rendering unit 420 and the method for rendering an image signal will be described with reference to FIGS. 4B and 5B. FIGS. 4B and 5B illustrate the structure of the signal rendering unit 420 and the method for rendering an image signal which can be adopted to a case where each pixel is composed of three sub-pixels, like FIG. 3A or 3B, in spite of the apparatus rendering four primary color signals like FIG. 3A or FIG. 3B.

FIG. 4B is a block diagram illustrating the structure of the signal rendering unit 420, and FIG. 5B is a detailed flowchart illustrating step S240 shown in FIG. 5A.

The signal rendering unit 420 shown in FIG. 4B includes a first sub-pixel rendering part 430, a second sub-pixel rendering part 440, a third sub-pixel rendering part 450, and a signal selection part 460.

Two signals among the four color signals P1, P2, P3, and P4 outputted from the signal conversion unit 410 are inputted into the first sub-pixel rendering part 430 and the second sub-pixel rendering part 440, respectively. The first and second sub-pixel rendering parts 430 and 440 recalculate level values for rendering first and second sub-pixels according to position arrangement between sub-pixels (S242 and S244).

The other two signals P3 and P4 outputted from the signal conversion unit 410 are inputted into the signal selection part 460, and the signal selection part 460 selects one of the two signals inputted, according to the type of a sub-pixel filter at a position of the image to be rendered, and outputs the selected signal (S246).

The signal outputted from the signal selection part 460 is inputted into the third sub-pixel rendering part 450, and the third sub-pixel rendering part 450 recalculates a level value for rendering a third sub-pixel, according to position arrangement between sub-pixels (S248). The two signals inputted into the signal selection part 460 are signals which correspond to the sub-pixels that alternate for each pixel.

Figure 4C:
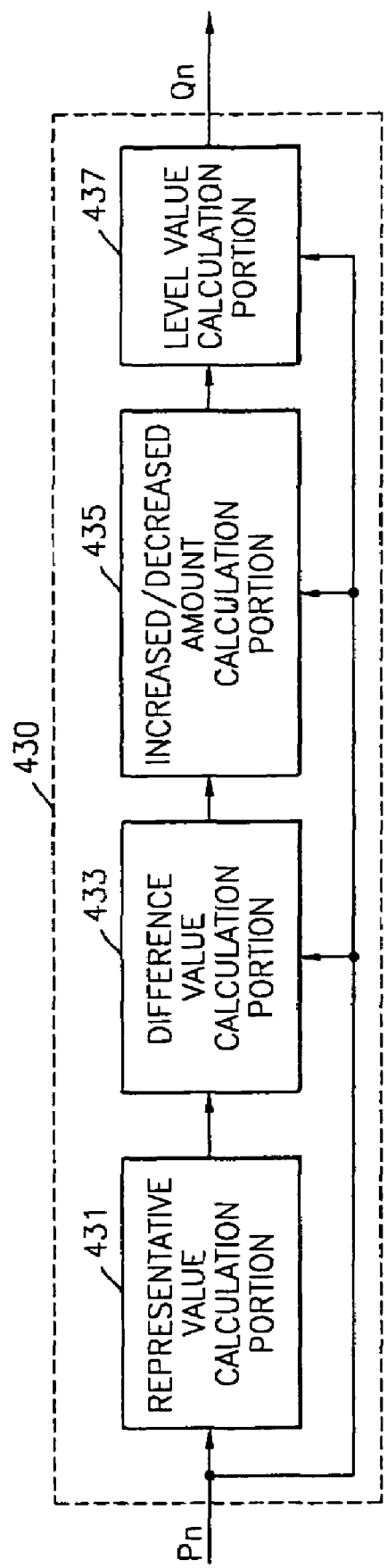
FIG. 4C is a block diagram illustrating the structure of a sub-pixel rendering part 430 shown in FIG. 4B.

FIG. 4C is a block diagram illustrating the structure of the first sub-pixel rendering part 430. In FIG. 4C, the second and third sub-pixel rendering parts 440 and 450 have the same structure as that of the first sub-pixel rendering part 430. The first sub-pixel rendering part 430 includes a representative value calculation portion 431, a difference value calculation portion 433, an increase/decrease amount calculation portion 435, and a level value calculation portion 437.

Figure 5C:
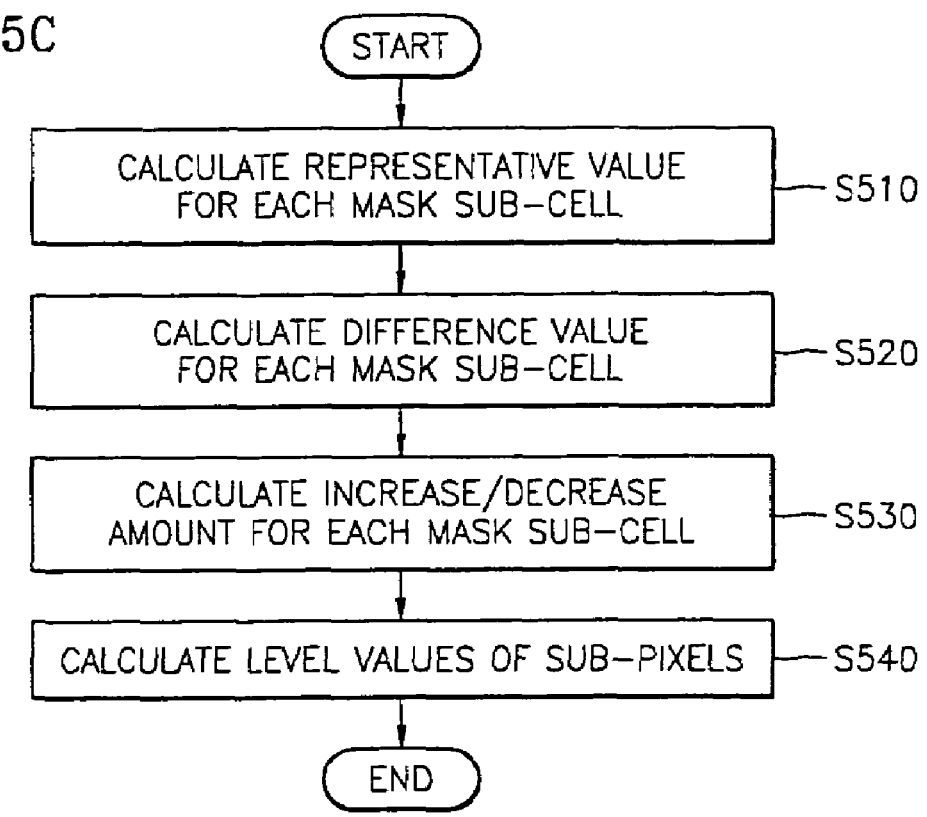
FIG. 5C is a flowchart illustrating the step of recalculating signal values of sub-pixels, performed by the first sub-pixel recalculation part 430.

FIG. 5C is a flowchart illustrating the step of recalculating signal values of sub-pixels, performed by the first sub-pixel recalculation part 430.

The image signal P1 inputted into the first sub-pixel rendering part 430 is inputted into the representative value recalculation portion 431, and the representative value recalculation portion 431 calculates a representative value for each mask sub-cell (S510).

The mask is used to calculate a brightness value for each sub-pixel of the display and is composed of a predetermined number of cells with a size corresponding to the size of each pixel in the apparatus for rendering an image signal. The mask may have either a 3×3 area as shown in FIG. 6A or a 5×5 area as shown in FIG. 6B. The masks may have sizes other than the sizes shown in FIGS. 6A and 6B, the widths and heights of the masks are not required to be the same.

Figure 7:
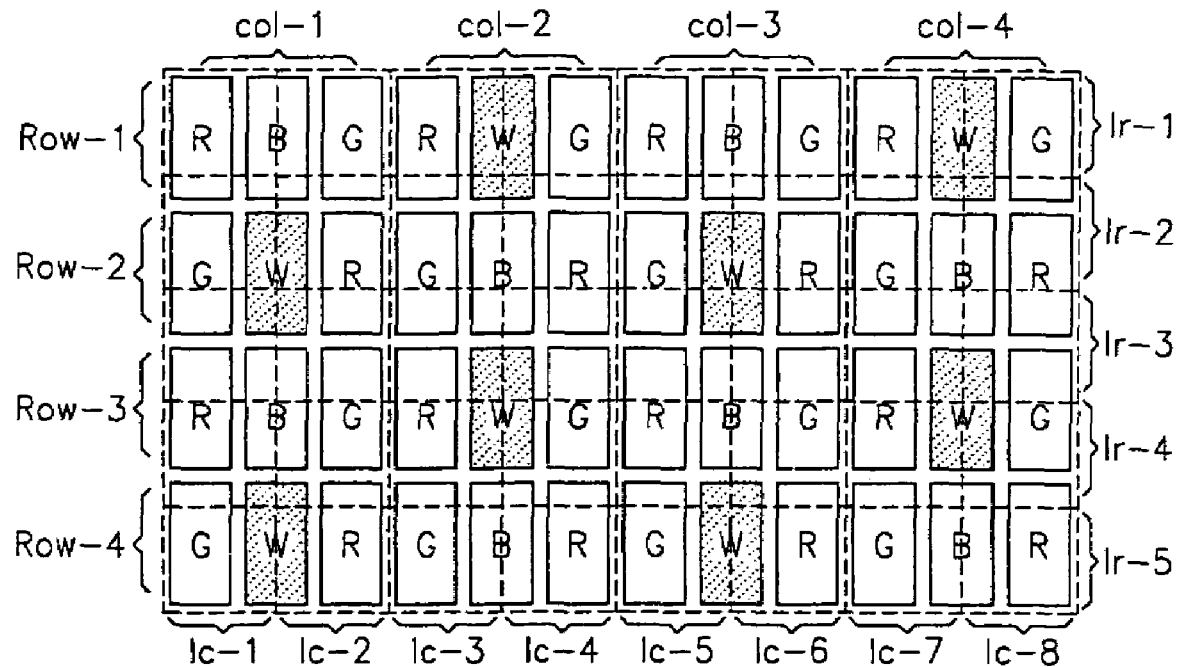
FIGS. 7 and 8 illustrate a case where the resolution of an inputted image is different from the resolution of a display.

Determination of the size and weight for each mask sub-cell depends on the type of the sub-pixel forming a pixel. FIG. 7 illustrates an example of a color filter which can be applied to the present invention. The structure of the color filter shown in FIG. 7 illustrates a case where an 8×5 spatial resolution (width: 8, height: 5) of an inputted image is higher than a 4×4 spatial resolution (width: 4, height: 4) of the display in the filter structure shown in FIG. 3B.

In this case, a pixel has an alternative structure of RGB and RGW. Thus, a pixel is composed of sixteen R and G sub-pixels and eight B and W sub-pixels.

Accordingly, the size of a mask cell (see 61 and 62 of FIG. 9A) when R and G sub-pixels are processed, and the size of a mask cell (see 63 and 64 of FIG. 9B) when B and W sub-pixels are processed have to be varied.

Figure 8:
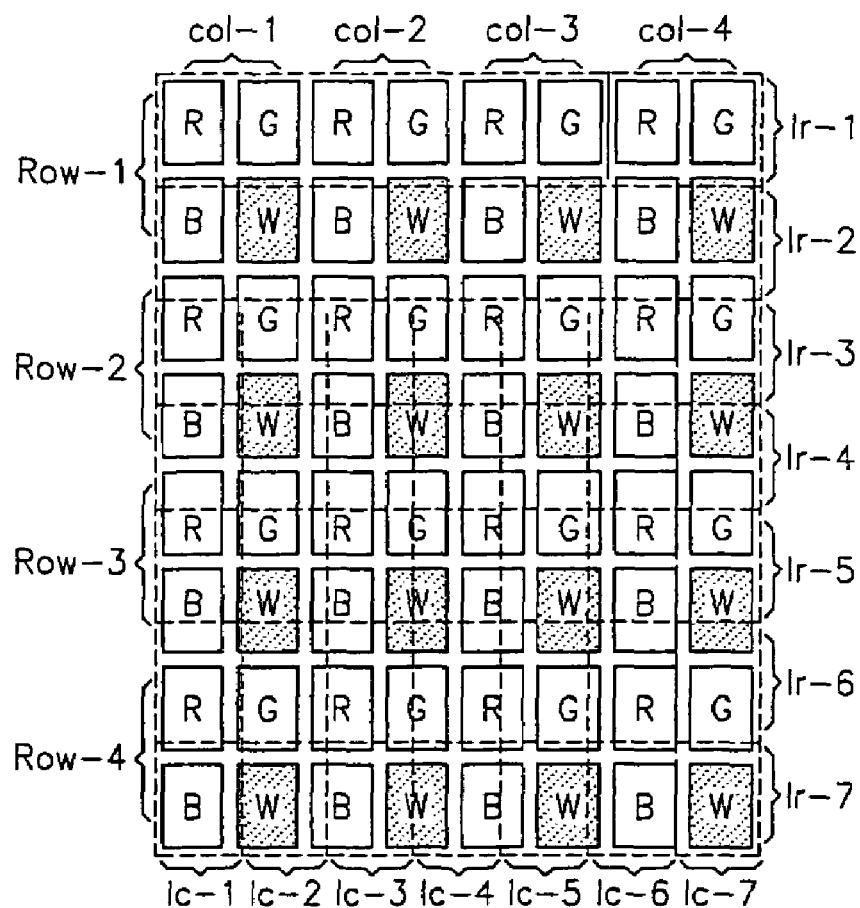
Figure 10:
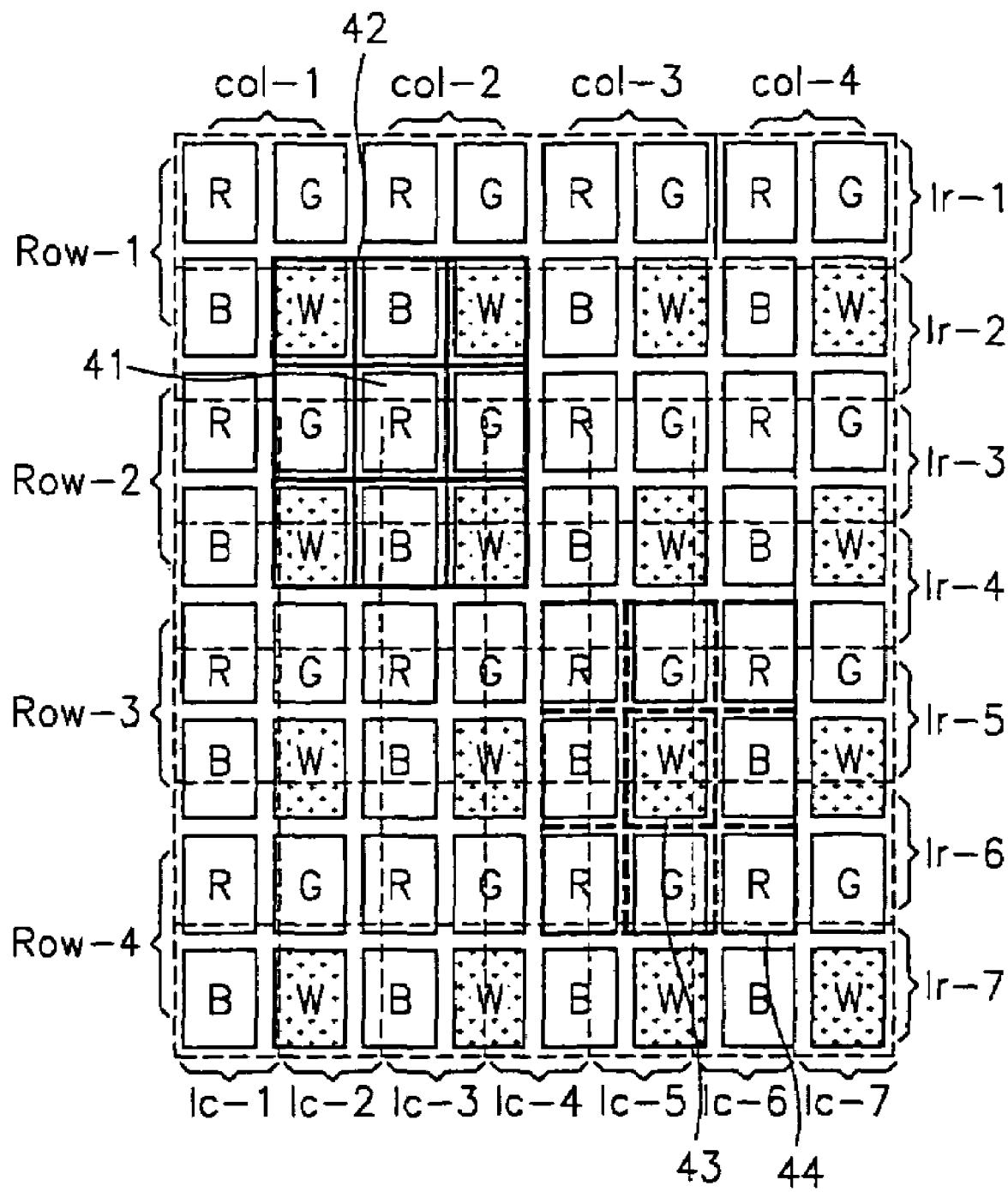
FIG. 10 shows an example in which a mask is applied to pixel blocks shown in FIG. 8.

However, as shown in FIG. 8, when a pixel is composed of the same sub-pixel, the size of a mask cell may be the same for each of the R, G, B, and W sub-pixels, as shown in FIG. 10. In the present embodiment, the resolution of the inputted image is set to 1280 (W)×768 (H), the resolution of the apparatus is set to 640 (W)×768 (H), and the size of the mask is set to 3×3. In this case, the size of the mask sub-cell is the same as that of a sub-pixel, and a weight for each mask cell is set to m22=½, m12=m21=m23=m32=⅛, and m11=m33=m31=m33=0.

The representative value calculation portion 431 calculates a representative value for each mask sub-cell. In the case of the mask with a 3×3 area, the representative value calculation portion 431 calculates values for 9 mask sub-cells. In the case of the mask with a 5×5 area, the representative value calculation portion 431 calculates values for 25 mask sub-cells.

Figure 5D:
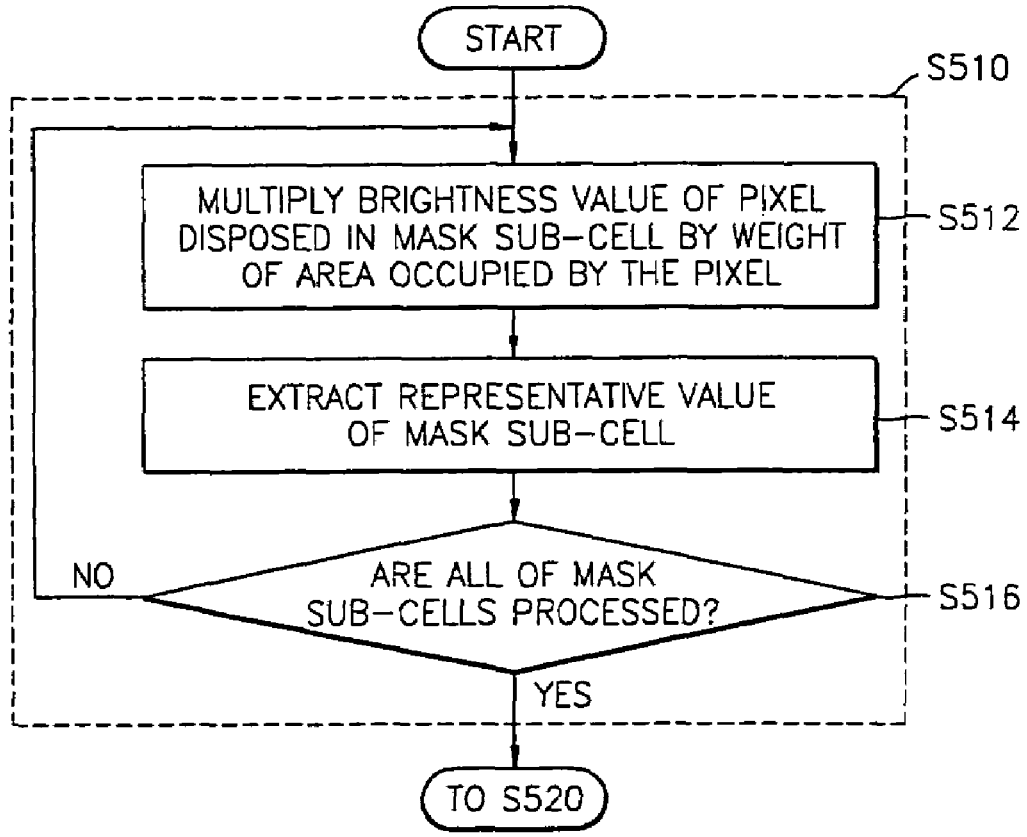
Figure 9A:
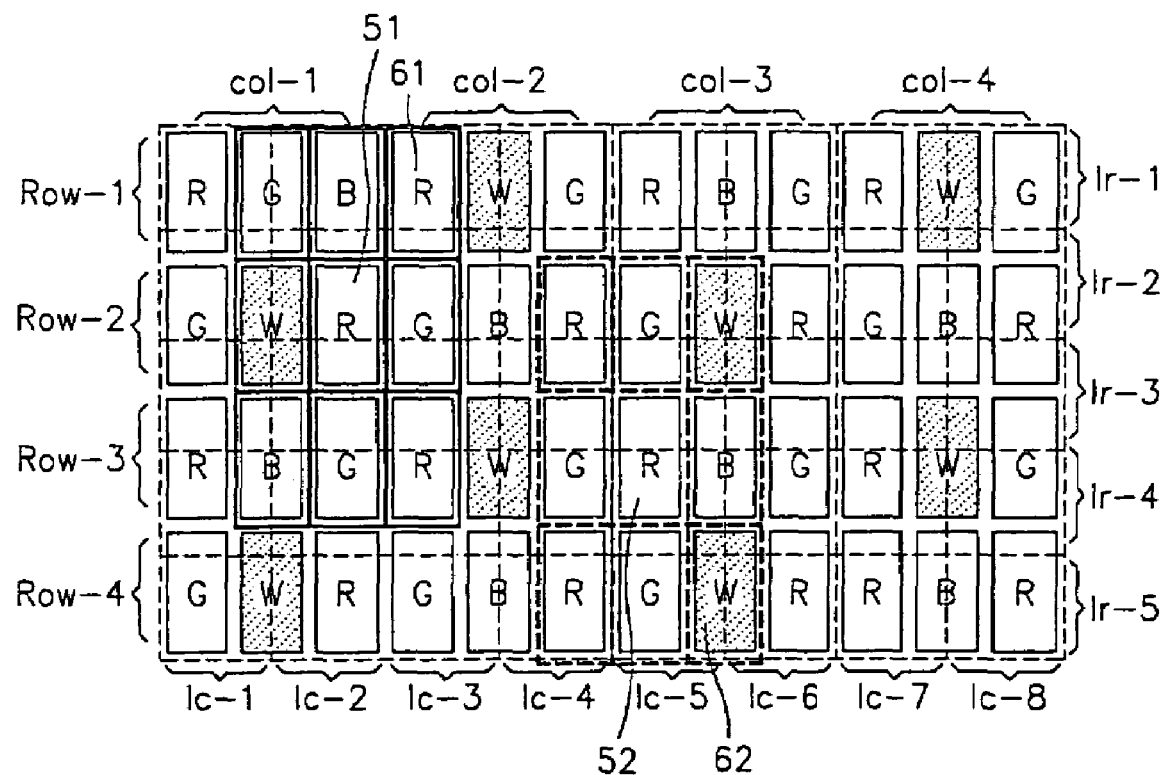
FIGS. 9A and 9B show examples in which a mask is applied to pixel blocks shown in FIG. 7.
Figure 9B:
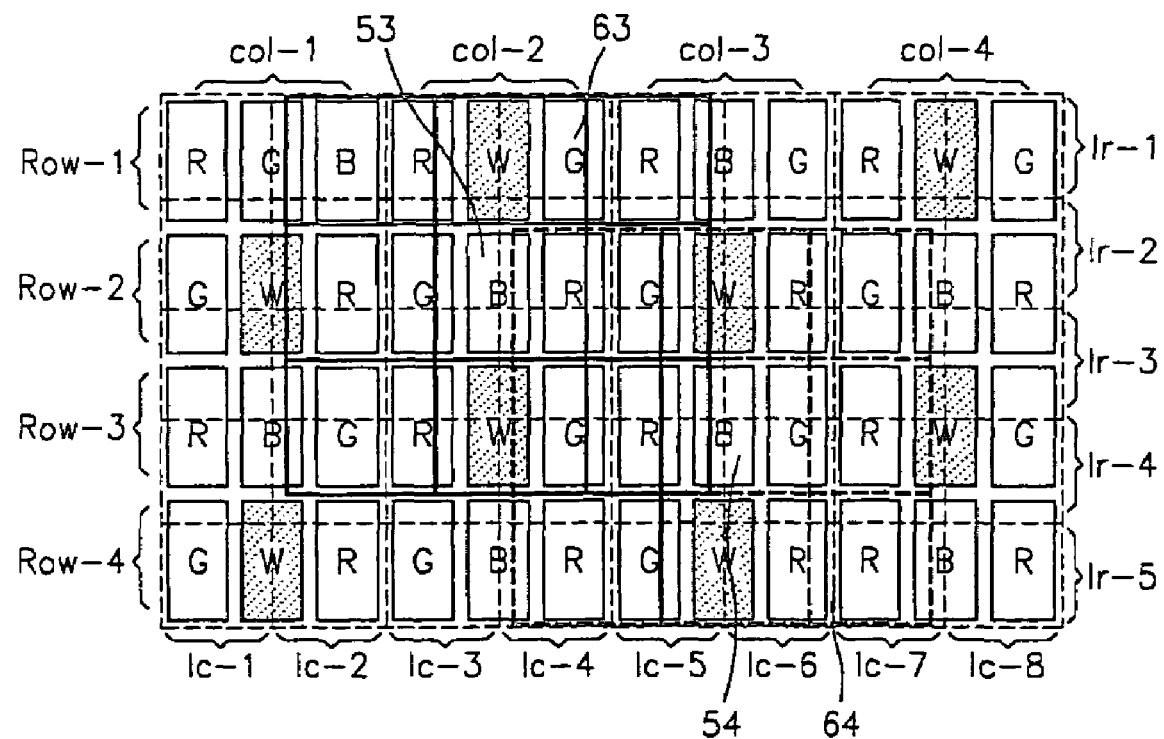

Referring to FIG. 5D, which is a flowchart illustrating the step performed by the representative value calculation portion 431, one or more pixels may overlap on certain sub-pixels, as shown in FIGS. 9A and 9B. The representative value calculation portion 431 multiplies the brightness value of a pixel disposed in a mask sub-cell by the weight of an area occupied by the pixel (S512).

The representative value calculation portion 431 calculates Mref(i) (hereinafter, a representative value for a mask sub-cell) which represents a mask sub-cell obtained by equation 1 (S514).

$$Mref(i) = \sum_{j=0}^{q} A(i, j) \times I(i, j) \tag{1}$$

Here, i is an index which represents an i-th mask sub-cell, q is the number of pixels in the i-th mask sub-cell, A(i,j) represents a weight for a j-th pixel in the i-th mask sub-cell, and I(i,j) represents a brightness value of the j-th pixel in the i-th mask sub-cell.

Meanwhile, in the present embodiment, the weight A(i,j) is obtained by an areal ratio of the j-th pixel in the i-th mask sub-cell. The areal ratio is varied with a ratio of the image resolution to the apparatus resolution and arrangement of sub-pixels.

Calculation of the representative value for each mask sub-cell is performed according to the number of mask sizes (S516). In the present embodiment, a center mask sub-cell m22 and adjacent mask sub-cells m21, m12, m23, and m32 arranged above, below, right, and left of the center mask sub-cell m22 are used in the mask with a 3×3 area.

An image signal, in which a representative value of a mask sub-cell is calculated, is inputted into the difference value calculation portion 433, and the difference value calculation portion 433 calculates the difference value by obtaining spatial deviation information on adjacent mask sub-cells from each mask sub-cell (S520).

Referring to FIG. 5E, which is a detailed flowchart illustrating the step S520 of FIG. 5C, the difference value calculation portion 433 checks whether a mask cell, in which the difference value will be calculated, is the center of the mask (when the size of the mask is 3×3, a center becomes m22, and when the size of the mask is 5×5, a center becomes m33) (S521).

If the mask sub-cell is the center of the mask, an average value Neighbor_ave(i) of representative values for peripheral mask sub-cells is obtained (S522). After that, a difference between the average value and a representative value Mref(i) of a center mask sub-cell is obtained (S523), and a difference value Mdiff(i) for each mask sub-cell is extracted (S525).

If the mask sub-cell is not the center of the mask, the difference value calculation portion 433 calculates the difference between a representative value of the center mask sub-cell and a representative value of the corresponding peripheral mask sub-cell as shown in equation 2 (S524), and the difference value Mdiff(i) for each mask sub-cell is extracted (S525).

$$Mdiff(i) = \text{Neighbor\_ave}(i) - Mref(i) \tag{2}$$

The difference value calculation portion 433 checks whether difference values for all mask sub-cells are calculated and repeats the above-described steps until the difference values for all mask sub-cells are calculated (S526). If the difference values for all mask sub-cells are calculated, the difference value calculation portion 433 outputs a calculation result to the increase/decrease amount calculation portion 435.

The increase/decrease amount calculation portion 435 which receives an image signal, calculates the size of an increase/decrease amount to be applied to a sub-pixel (S530) using the difference value, which is spatial deviation information calculated in the above-mentioned step S520.

Figure 5F:
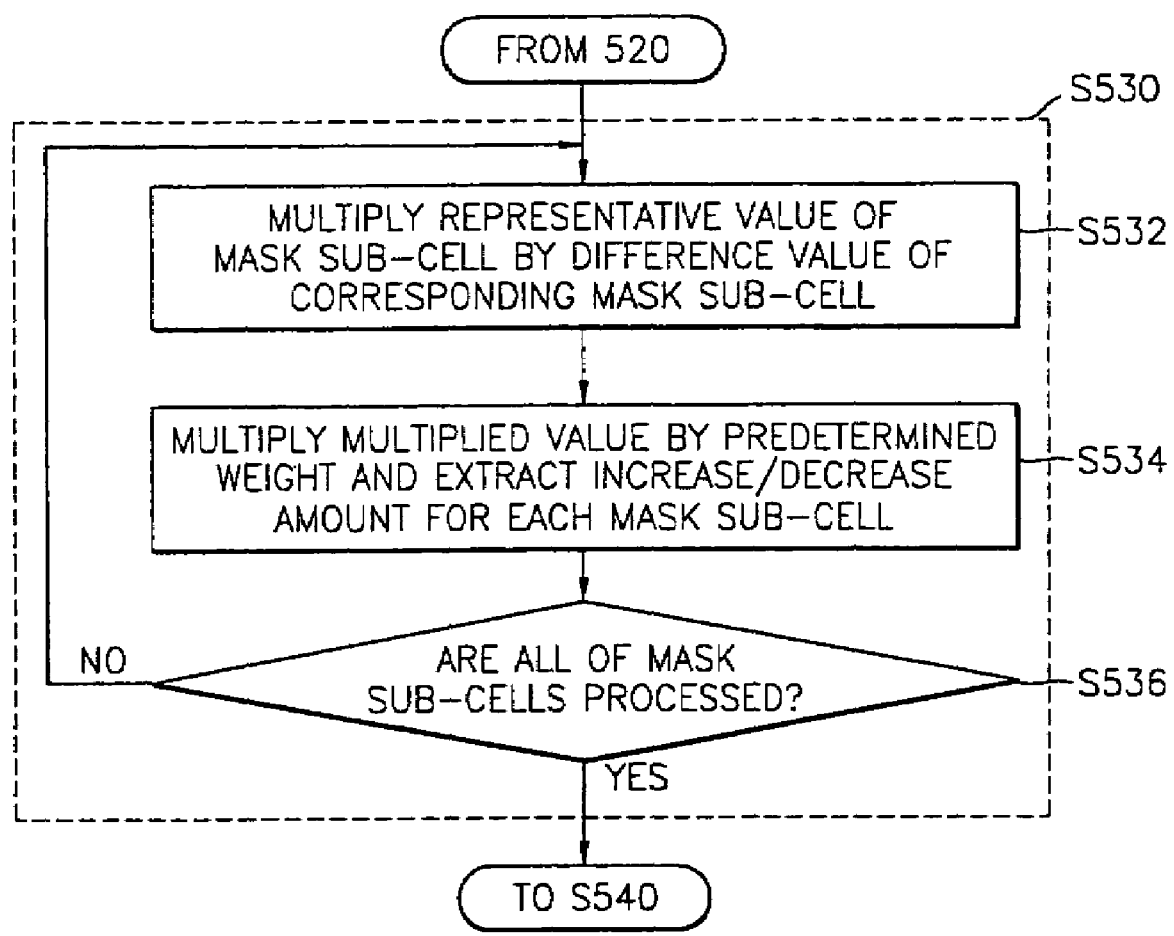

Referring to FIG. 5F, which is a detailed flowchart illustrating the step S530 of FIG. 5C, the increase/decrease amount calculation portion 435 multiplies the representative value Mref(i) of the mask sub-cell by the difference value Mdiff(i) of the corresponding mask sub-cell with respect to each of the inputted mask sub-cells (S532). After that, the increase/decrease amount calculation portion 435 multiplies the multiplied value by a predetermined weight W2(i), and extracts an increase/decrease amount Minc(i) for each mask sub-cell as shown in equation 3 (S534).

$$Minc(i)=Mref(i) \times Mdiff(i) \times W2(i) \quad (3)$$

The increase/decrease amount calculation portion 435 checks whether increase/decrease amounts with respect to all mask sub-cells are calculated (S536) and repeats the above steps S532 and S534 with respect to all of the mask sub-cells. Increase/decrease amounts calculated for all of the mask sub-cells are outputted to the level value calculation portion 437.

The level value calculation portion 437 calculates a sub-pixel value using the increase/decrease amounts calculated for each mask sub-cell (S540).

Figure 5G:
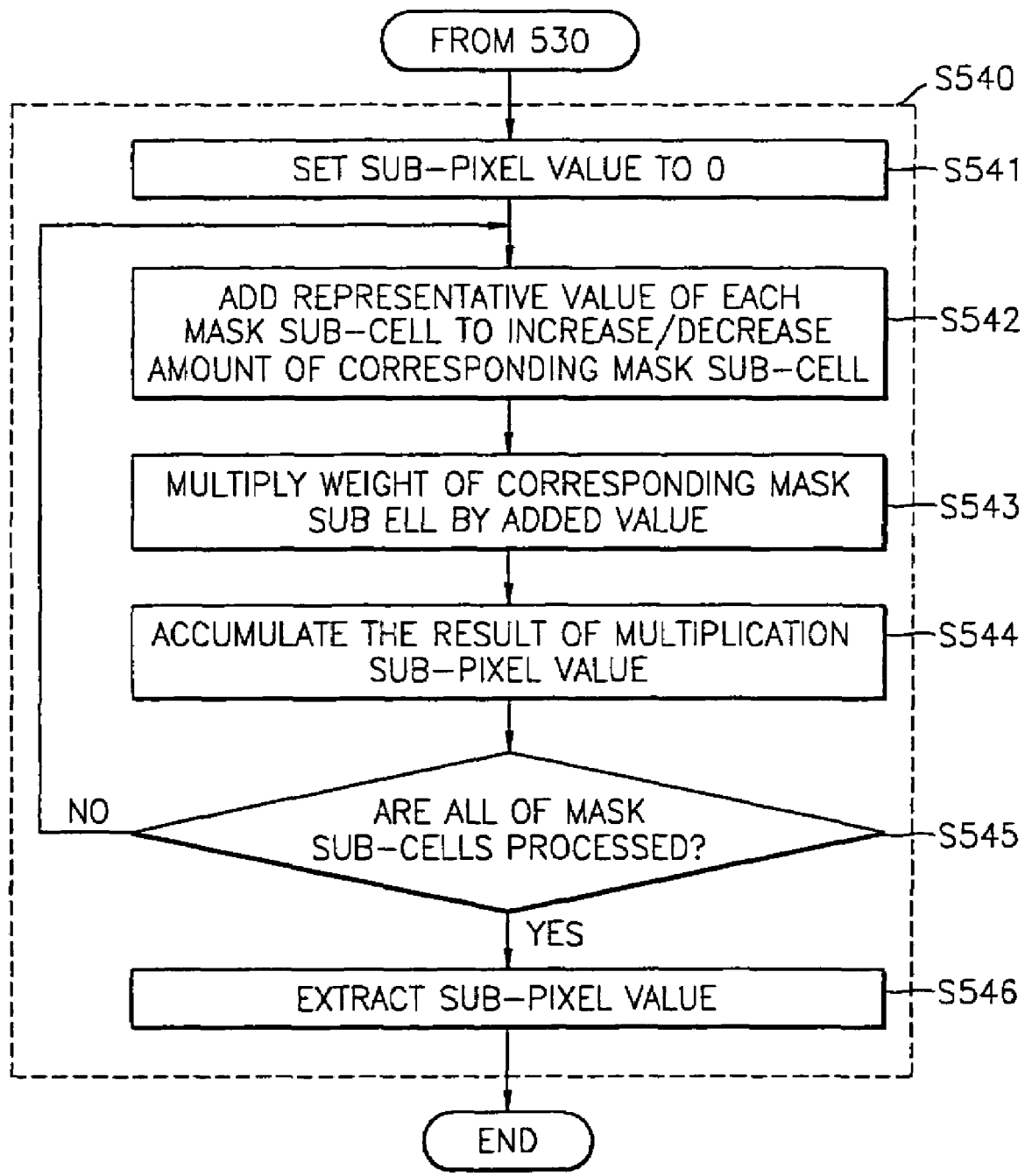

Referring to FIG. 5G, the level value calculation portion 437 sets the sub-pixel value to 0 (S541) and adds the representative value Mref(i) of each mask sub-cell to the increase/decrease amount Minc(i) of the corresponding mask sub-cell (S542).

After that, the level value calculation portion 437 multiplies a weight W3(i) of the corresponding mask sub-cell by the added value (S543), and accumulates the result of multiplication to the sub-pixel value (S544).

If the level value calculation portion 437 performs the above-mentioned steps S542 through S544 with respect to all of the mask sub-cells (S545), the level value calculation portion 437 extracts a sub-pixel value Sout(x,y) at a corresponding position as shown in equation 4 (S546).

$$Sout(x, y) = \sum_{i=1}^{P} W3(i) \times \{Mref(i) + Minc(i)\} \quad (4)$$

Figure 11A:
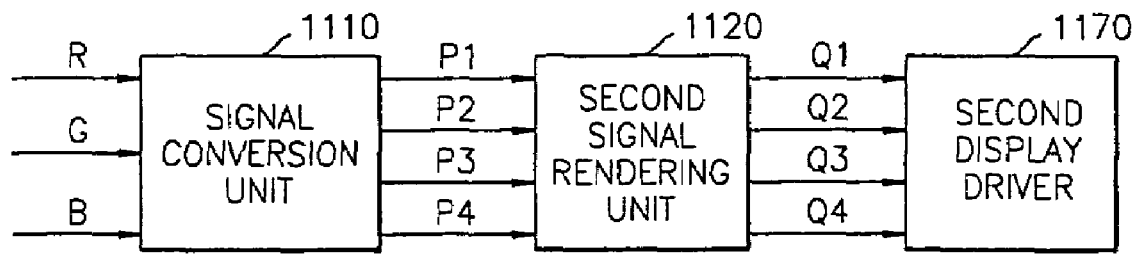
FIG. 11A is a block diagram illustrating the structure of an apparatus for rendering an image signal according to another embodiment of the present invention.

FIG. 11A is a block diagram illustrating the structure of an apparatus for rendering an image signal according to another embodiment of the present invention, which can be adopted to a case where the number of sub-pixels forming a pixel is four, as shown in FIGS. 2A and 2B. FIG. 12 is a flowchart illustrating a method for rendering an image signal according to another embodiment of the present invention, which can be adopted to a case where the number of sub-pixels forming a pixel is four, as shown in FIGS. 2A and 2B.

The apparatus for rendering an image signal according to the present invention, which can be adopted to the case where the number of sub-pixels forming a pixel is four, includes a signal conversion unit 1110, a second signal rendering unit 1120, and a second display driver 1170. In addition, the second signal rendering unit 1120 includes a fourth sub-pixel rendering part 1130, a fifth sub-pixel rendering part 1140, a sixth sub-pixel rendering part 1150, and a seventh sub-pixel rendering part 1160.

If image signals with spatial resolution higher than that of the display are inputted into the apparatus, which renders four primary color (RGBW) image signals and has a certain spatial resolution according to an embodiment of the present invention (S1200), three primary color image signals R, G, and B are converted into four color signals by the signal conversion unit 1110, and the converted four color signals are outputted to the second signal rendering unit 1120 (S1220).

The second signal rendering unit 1120 receives the four color signals P1, P2, P3, and P4, calculates brightness values for each sub-pixel with respect to the four inputted color signals P1, P2, P3, and P4, and outputs a calculation result to the second display driver 1170 (S1240).

Figure 11B:
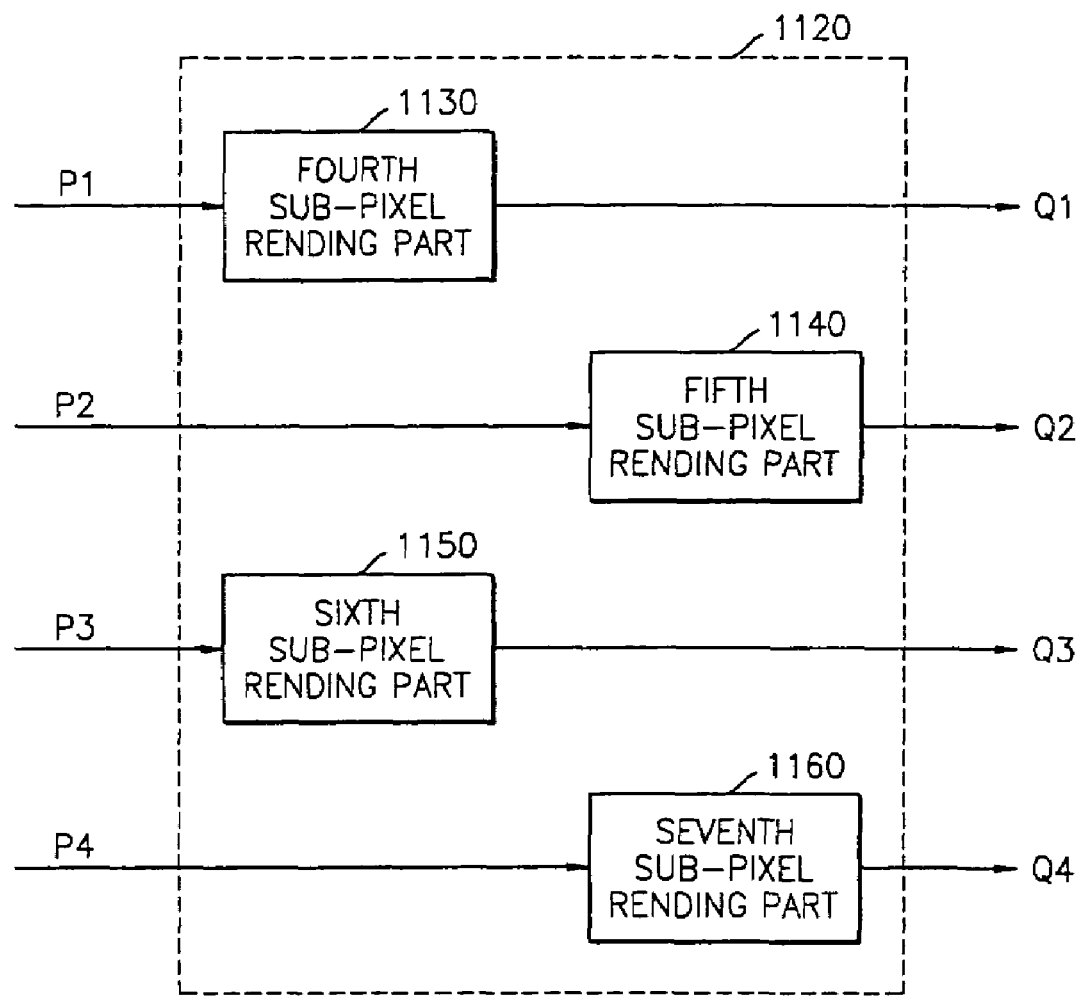
FIG. 11B is a block diagram illustrating the structure of the second signal rendering unit shown in FIG. 11A.

Each of the four color signals P1, P2, P3, and P4 outputted from then signal rendering unit 1110 are inputted into the fourth sub-pixel rendering part 1130, the fifth sub-pixel rendering part 1140, the sixth sub-pixel rendering part 1150, and the seventh sub-pixel rendering part 1160, respectively. The fourth through seventh sub-pixel rendering parts 1130, 1140, 1150, and 1160 recalculate level values for rendering fourth through seventh sub-pixels according to position arrangement between sub-pixels. Detailed block diagrams of each of the fourth through seventh sub-pixel rendering parts 1130, 1140, 1150, and 1160, shown in FIG. 11B, are the same as that of the first sub-pixel rendering part 430. In addition, the steps of recalculating signal values of sub-pixels are the same as that shown in FIG. 5C.

The second display driver 1170 controls output brightness according to the brightness values of the four primary color signals P1, P2, P3, and P4 (S1260). A1

A method for rendering an image signal according to the present invention can also be embodied on computer readable recording media. The computer readable recording media includes all types of recording devices in which data that can be read by a computer system is stored, such as ROMs, RAMs, OD-ROMs, magnetic tapes, floppy discs, and optical data storage units. Also, the computer readable recording media is distributed over a network-connected computer system and can be stored and executed by computer readable code.

As described above, when an image having a high resolution is rendered in a display having a low resolution, an aliasing phenomenon which causes degradation of image quality can occur. In a method and apparatus for rendering an image signal, this aliasing phenomenon can be reduced by improving the low resolution rendering capability of the apparatus for rendering an image through sub-pixel control. Because of this structure, the effects of reducing a driver chip, removing a fine work, and increasing the amount of light which can be transmitted through a filter, can be achieved.

In the present embodiment of the present invention in which an image is rendered as four channels by adding one primary color to three RGB primary colors, when the added primary color is white, an output light can be increased, and when the added primary color is a primary color excluding RGB colors, a renderable color area can be enlarged.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for rendering image signals in an apparatus for rendering an image signal comprising pixels which are composed of three different sub-pixels among four or more different sub-pixels representing four or more color signals respectively, the method comprising:

(a) selecting three-color signals out of the four or more color signals to be outputted according to a type of sub-pixel, which forms a predetermined pixel;

(b) obtaining values of the selected three-color signals in peripheral pixels of the pixels;

(c) calculating brightness values of each sub-pixel of the pixel by using the values of the selected three-color signals and corresponding color signal values of the peripheral pixels; and (d) driving a display, which controls brightness of an image that is represented in the display according to the calculated brightness values of sub-pixels.

2. The method of claim 1, before (a), further comprising receiving three-color image signals and converting the three-color image signals into four or more color image signals.

3. The method of claim 1, wherein in (c), the brightness values of the sub-pixels are obtained by calculating an average value between the level values of the selected three-color signals and the corresponding color signal values of the peripheral pixels.

4. The method of claim 1, wherein (a) through (d) are performed with respect to all pixels of the display.

5. A method for rendering image signals in an apparatus for rendering an image signal comprising pixels which are composed of three different sub-pixels among four or more different sub-pixels representing four or more signals respectively, the method comprising:

(a) selecting one-color signal out of the four or more color signals excluding predetermined two-color signals according to a type of sub-pixel, which forms a predetermined pixel;

(b) obtaining a value of the selected one-color signal and representing the level values in peripheral pixels of the pixels;

(c) calculating brightness values of each sub-pixel of the pixel by using the value of the selected one-color signal and corresponding color signal values of the peripheral pixels; and (d) driving a display, which controls brightness of an image that is represented in the display according to the calculated brightness values of three sub-pixels.

6. The method of claim 5, before (a), further comprising receiving three-color image signals and converting the three-color image signals into four or more color image signals.

7. The method of claim 5, wherein in (c), the brightness values of the sub-pixels are obtained by calculating an average value between the level value of the selected one-color signal and the corresponding color signal values of the peripheral pixels.

8. The method of claim 5, wherein (c) comprises:

(c1) generating a representative value, which is the value of a predetermined color signal and to represent color signals of the sub-pixels contained in the pixels among inputted color signals in each mask sub-cell, with respect to each mask sub-cell;

(c2) generating deviation information on a representative value between a center mask sub-cell and an adjacent mask sub-cell; and (c3) generating output color signal values, which are represented by sub-pixels contained in the center mask sub-cell to represent a predetermined color signal among the inputted color signals in an entire mask, according to the representative value and the deviation information;

wherein the mask includes a predetermined number of sub-cells having a size smaller than that of a pixel, and the sub-pixels that represent the predetermined color signal are contained in the center mask sub-cell.

9. The method of claim 8, wherein in (c1), the representative value is generated by multiplying inputted color signal values which are to be represented in the mask sub-cell, by an areal weight.

10. The method of claim 8, wherein in (c2), the deviation information on the representative value between the center mask sub-cell and the adjacent mask sub-cell is generated by calculating a difference between the representative value of the center mask sub-cell and the representative value of the adjacent mask sub-cell.

11. The method of claim 8, wherein in (c3), the output color signal values which are represented by sub-pixels contained in the center mask sub-cell, are generated by calculating an increase/decrease amount of the representative value of the mask sub-cell according to the representative value for each mask sub-cell and the deviation information, and adding the increase/decreased amount by the representative value.

12. A computer readable recording medium where the method for rendering an image signal of claim 1 is recorded as an executable program code.

13. A computer readable recording medium where the method for rendering an image signal of claim 8 is recorded as an executable program code.

14. An apparatus for rendering an image signal comprising pixels which are composed of three different sub-pixels among four or more different sub-pixels representing four or more colors respectively, the apparatus comprising:

a signal selection unit that selects three-color signals with respect to each pixel out of the four or more color signals according to a type of sub-pixel, which forms a predetermined pixel;

a color signal extracting unit that obtains values of the selected three-color signals to be represented in peripheral pixels of the pixels;

a sub-pixel rendering unit that calculates brightness values to be represented in sub-pixels contained in the pixel by using the level values of the selected three-color signals and color signal values of the peripheral pixels; and a display driver that controls brightness of an image that is represented in the display according to the calculated brightness values of sub-pixels.

15. The apparatus of claim 14, further comprising a signal conversion unit that receives three-color image signals and converts the three-color image signals into four or more color image signals.

16. The apparatus of claim 14, wherein the sub-pixel rendering unit obtains the brightness values of the sub-pixels by calculating an average value between the level values of the selected three-color signals and the color signal values of the peripheral pixels.

17. An apparatus for rendering an image signal comprising pixels which are composed of three different sub-pixels among four or more different sub-pixels representing four or more colors respectively, the apparatus comprising:

a signal selection unit that selects an one-color signal out of the four or more color signals excluding predetermined two-color signals according to a type of sub-pixel, which forms a predetermined pixel;

a color signal extracting unit that obtains a value of the selected one-color signal to be represented in peripheral pixels of the pixels;

a sub-pixel rendering unit that calculates brightness values to be represented in sub pixels contained in the pixels by using the value of the selected one-color signal and values of color signals of the peripheral pixels; and a display driver that controls brightness of an image that is represented in the display according to the calculated brightness values of three sub-pixels.

18. The apparatus of claim 17, further comprising a signal conversion unit that receives three-color image signals and converts the three-color image signals into four or more color image signals.

19. The apparatus of claim 17, wherein the sub-pixel rendering unit obtains the brightness values of the sub-pixels by calculating an average value between the level value of the selected one-color signal and the color signal values of the peripheral pixels.

20. The apparatus of claim 14, wherein the sub-pixel rendering unit comprises:
  a representative value calculation part that generates a representative value, which is a color signal value, to be outputted to represent color signals of the sub-pixels contained in the pixels among inputted color signals in each mask sub-cell, with respect to each mask sub-cell;
  a difference value calculation part that generates deviation information on a representative value between a center mask sub-cell and an adjacent mask sub-cell; and
  a sub-pixel value generation part that generates values of output color signals to be represented by sub-pixel contained in the center mask sub-cell to represent a predetermined color signal among the inputted color signals in an entire mask according to the representative value and the deviation information;
  wherein the mask includes a predetermined number of sub-cells having a size smaller than that of a pixel, and the sub-pixels that represent the predetermined color signal are contained in the center mask sub-cell.

21. The apparatus of claim 20, wherein the representative value calculation part generates the representative value by multiplying inputted color signal values, which are represented in the mask sub-cell, by an areal weight.

22. The apparatus of claim 20, wherein the difference value calculation part generates the deviation information on the representative value between the center mask sub-cell and the adjacent mask sub-cell by calculating a difference between the representative value of the center mask sub-cell and the representative value of the adjacent mask sub-cell.

23. The apparatus of claim 20, wherein the sub-pixel value generation part generates the outputted color signal values which are represented by sub-pixels contained in the center mask sub-cell, by calculating an increase/decrease amount of the representative value of the mask sub-cell according to the representative value for each mask sub-cell and the deviation information, and adding the increase/decreased amount by the representative value.

24. A method for rendering image signals which represent a predetermined number of colors in an apparatus with a plurality of pixels composed of a plurality of sub-pixels, the method comprising:
  (a) setting a mask having a predetermined number of sub-cells smaller than the pixel so that a center mask sub-cell includes sub-pixels that represent a predetermined color signal;
  (b) generating a representative value, which is a color signal value, to be outputted to represent the predetermined color signals among inputted color signals with respect to each mask sub-cell;
  (c) generating deviation information on a representative value between a center mask sub-cell and an adjacent mask sub-cell; and
  (d) generating output color signal values to be represented by sub-pixel contained in the center mask sub-cell and to represent a predetermined color signal among the inputted color signals in an entire mask according to the representative value and the deviation information.

25. The method of claim 24, wherein in (b), the representative value is generated by multiplying inputted color signal values, which are to be represented in 25 the mask sub-cell, by an areal weight.

26. The method of claim 24, wherein in (c), the deviation information on the representative value on the center mask sub-cell is generated by calculating a difference between the representative value of the center mask sub-cell and the average representative value of the adjacent mask sub-cell.

27. The method of claim 24, wherein in (c), the deviation information on the representative value of the adjacent mask sub-cell is generated by calculating a difference between the representative value of the center mask sub-cell and the representative value of the adjacent mask sub-cell.

28. The method of claim 24, wherein in (d), the outputted color signal values which are represented by sub-pixels contained in the center mask sub-cell, are generated by calculating an increase/decrease amount of the representative value of the mask sub-cell according to the representative value for each mask sub-cell and the deviation information, and adding the increase/decreased amount by the representative value.

29. A method for rendering image signals in an apparatus with a plurality of pixels composed of a plurality of sub-pixels, the method comprising:
  (a) selecting a second predetermined number of color signals out of a first predetermined number of color signals to be represented in the apparatus according to the type of a sub-pixel of the apparatus;
  (b) setting a mask having a predetermined number of sub-cells smaller than the pixel so that a center mask sub-cell includes sub-pixels that represent predetermined color signals among the second predetermined number of color signals;
  (c) generating a representative value, which is a color signal value, to be outputted to represent the predetermined color signal in the sub-pixel corresponding to each mask sub-cell, with respect to each mask sub-cell;
  (d) generating deviation information on a representative value between a center mask sub-cell and an adjacent mask sub-cell;
  (e) generating output color signal values which are represented by sub-pixel contained in the center mask sub-cell to represent the predetermined color signal among the second predetermined number of color signals in an entire mask area according to the representative value and the deviation information; and
  (f) performing (b) through (e) with respect to all of the second predetermined number of color signals.

30. The method of Claim 29, before (a), further comprising receiving three-color image signals and converting the three-color image signals into the first predetermined number of color signals.

31. The method of Claim 29, wherein in (c), the representative value is generated by multiplying inputted color signal values which are represented in the mask sub-cell, by an areal weight.

32. The method of Claim 29, wherein in (d), the deviation information on the representative value on the center mask sub-cell is generated by calculating a difference between the representative value of the center mask sub-cell and the average representative value of the adjacent mask sub-cell.

33. The method of Claim 29, wherein in (d), the deviation information on the representative value on the adjacent mask sub-cell is generated by calculating a difference between the representative value of the center mask sub-cell and the representative value of the adjacent mask sub-cell.

34. The method of Claim 29, wherein in (e), the output color signal values which are represented by sub-pixels contained in the center mask sub-cell are generated by calculating an increase/decrease amount of the representative value of the mask sub-cell according to the representative value and the deviation information for each mask sub-cell and adding the increase/decreased amount by the representative value.

35. An apparatus with a plurality of pixels composed of a plurality of sub-pixels, the apparatus comprising:
   a representative value generation unit that generates a representative value, which is a color signal value to be outputted to represent predetermined color signals in the sub-cells of the mask having a predetermined number of sub-cells having a size smaller than that of the pixels, with respect to each mask sub-cell;
   a deviation information generation unit that generates deviation information on a representative value between a center mask sub-cell and an adjacent mask sub-cell;
   a sub-pixel value generation unit that generates output color signal values, which are represented by sub-pixels contained in the center mask sub-cell to represent the predetermined color signal among the inputted color signals in an entire mask according to the representative value and the deviation information; and
   a display driver to control brightness of an image that is represented in the display according to the output color signal values generated by the sub-pixel value generation unit.

36. The apparatus of Claim 35, wherein the representative value generation unit generates the representative value by multiplying inputted color signal values which are to be represented in the mask sub-cell, by an areal weight.

37. The apparatus of Claim 35, wherein the deviation information generation unit generates the deviation information on the representative value on the center mask sub-cell by calculating a difference between the representative value of the center mask sub-cell and the average representative value of the adjacent mask sub-cell.

38. The apparatus of Claim 35, wherein the deviation information generation unit generates the deviation information on the representative value on the adjacent mask sub-cell by calculating a difference between the representative value of the center mask sub-cell and the representative value of the adjacent mask sub-cell.

39. The apparatus of Claim 35, wherein the sub-pixel value generation unit generates the output color signal values which are represented by sub-pixels contained in the center mask sub-cell, by calculating an increase/decrease amount of the representative value of the mask sub-cell according to the representative value and the deviation information for each mask sub-cell and adding the increase/decreased amount by the representative value.

40. The apparatus of Claim 35, further comprising a signal selection unit that selects a second predetermined number of color signals out of a first predetermined number of color signals inputted according to the type of sub-pixel, which represents an image, and outputs the second predetermined number of selected color signals to the representative value generation unit.

41. The apparatus of claim 40, further comprising a signal conversion unit that receives three-color image signals and converts the three-color image signals into the first predetermined number of image signals.

* * * * *